Patented Feb. 20, 1940

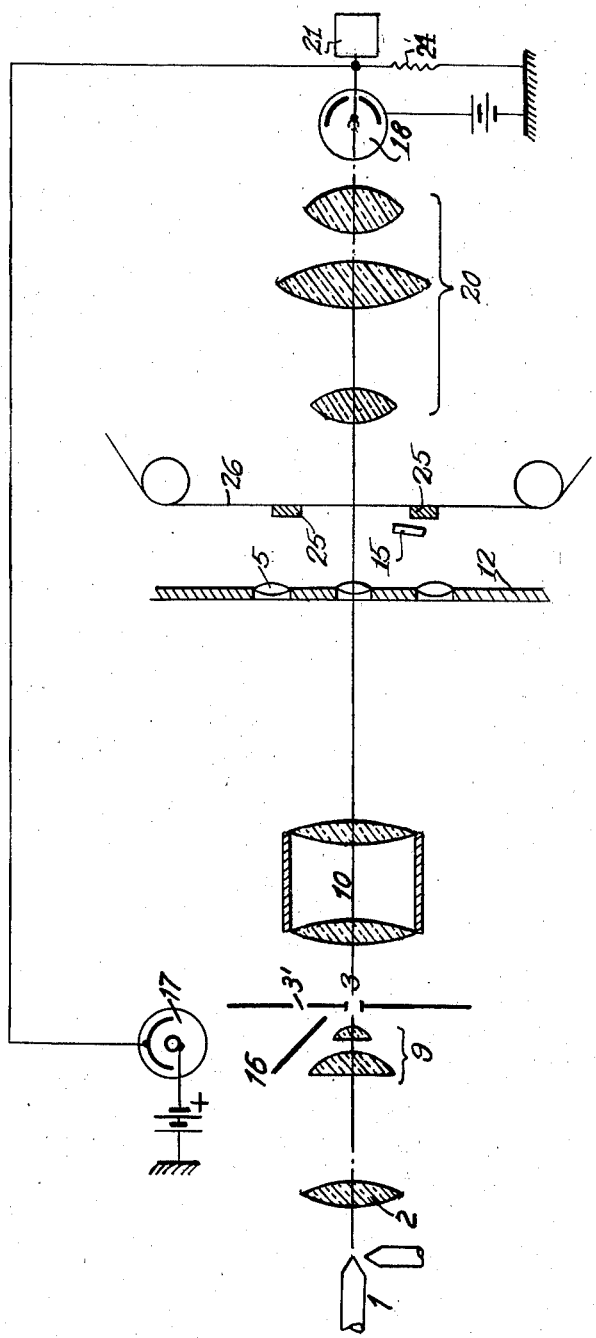

2,191,182

UNITED STATES PATENT OFFICE 2,191,182

OPTICAL ARRANGEMENT FOR SCANNING MACHINES

Kurt Schlesinger, Berlin, Germany, assignor, by mesne assignments, to Loewe Radio, Inc., a corporation of New York Application January 6, 1937, Serial No. 119,191
In Germany January 10, 1936

1 Claim. (Cl. 178—69.5)

It is well known in the television art to scan a moving film by a disc or drum fitted with a single or double rim of lenses.

The object of the present invention is a device for producing the synchronizing signals in a television transmitter having scanning means of the described kind.

The invention will be best understood by means of the accompanying drawing which shows diagrammatically a section along the optic axis of the arrangement.

In the drawing 1 is an arc lamp provided with a collimating lens 2, behind which there results practically parallel light. A condenser 9, preferably a double or triple condenser as known from the microscope art, concentrates the light on a diaphragm having an aperture 3 of .1 mm. diameter. The light passing this aperture is transformed in a parallel light bundle by a collimating lens 10 having a focal distance of approximately 50 mm. 12 is a rotating disc fitted for an example with a rim of lenses 5. By these lenses moving spots of light are projected upon the film gate 25—25 such scanning the film 26. The light passing the film is directed by a lens system 20 upon the photo-cell 18 which by resistance 24 is coupled with the amplifier 21.

Means for driving the film, interceptor disc, and other details which are not necessary for comprehension of the invention, are not shown.

As well known, after each scanning or partial scanning a short synchronizing signal has to be generated and transmitted. According to the invention this may be perfected in a very simple way which ensures automatic correction of errors in the position of the lenses 5 in a tangential direction. The method has already been described previously by the applicant (see Ser. No. 34,930, filed August 2, 1935, and Ser. No. 103,133, filed Sept. 29, 1936). In the present case there is simply disposed a slightly tilted mirror 15 in front of the edge of the film gate. This mirror reflects the impinging light back into the scanning optical system, and owing to its tilt there is produced an actual image point of the size of the aperture 3 to the side of this aperture. This image point is allowed to pass through a second aperture 3' in the same diaphragm and is directed, for example by means of a deflecting mirror 16, upon a synchronisation photocell 17. The cell 17 is polarized in opposite fashion to the main scanning cell 18 and is coupled by the same resistance 24 with the amplifier 21 so that the synchronizing signals are mixed with the video signals.

I claim:

In a television transmitter comprising a light source, a rotating scanning means fitted with lenses, an optic device projecting parallel light from said source upon said lenses, a film gate behind said lenses being scanned by said rotating lenses and a lens system directing said scanning beam upon a photo-cell and an amplifier coupled with said photo-cell: a synchronizing device consisting of a mirror being obliquely arranged at the edge of said gate and a second photo-cell coupled to the same amplifier, said mirror being adapted to reflect said scanning beam through said rotating lenses on said second photo-cell, said second photo-cell being coupled to the same amplifier.

KURT SCHLESINGER.